United States Patent [19]
Thompson et al.

[11] Patent Number: 5,942,084
[45] Date of Patent: Aug. 24, 1999

[54] PROCESS FOR THE SEPARATION OF SULPHIDES FROM PULPING LIQUORS USING AMPHOTERIC RESINS

[75] Inventors: Rokhsareh Thompson, Pointe Claire; Michael Paleologou, Beaconsfield; Richard McKinnon Berry, Ile Perrot; Craig J. Brown, Pickering; Michael Sheedy, North York, all of Canada

[73] Assignees: Pulp and Paper Research Institute of Canada, Pointe Claire; Eco-Tec Limited, Pickering, both of Canada

[21] Appl. No.: 08/788,187

[22] Filed: Jan. 24, 1997

[51] Int. Cl.$^6$ .................................................. D21C 11/04
[52] U.S. Cl. ...................... 162/30.11; 162/233; 210/686; 210/928; 423/181
[58] Field of Search .................................. 162/30.11, 29, 162/233; 210/683, 685, 686, 928; 423/181

[56] References Cited

U.S. PATENT DOCUMENTS

| | | | |
|---|---|---|---|
| 3,041,292 | 6/1962 | Hatch | 260/2.1 |
| 3,078,140 | 2/1963 | Hatch | 23/1 |
| 3,509,121 | 4/1970 | Benko | 260/124 |
| 3,965,070 | 6/1976 | Wuchter | 260/2.1 |
| 4,235,717 | 11/1980 | Lee et al. | 210/685 |
| 5,082,526 | 1/1992 | Dorris | 162/30.11 |
| 5,326,433 | 7/1994 | Ryham et al. | 162/14 |
| 5,500,085 | 3/1996 | Magnotta et al. | 162/30.11 |
| 5,536,384 | 7/1996 | Thompson et al. | 204/522 |

FOREIGN PATENT DOCUMENTS

| | | |
|---|---|---|
| 0 649 939 | 4/1995 | European Pat. Off. . |
| 0 654 558 | 5/1995 | European Pat. Off. . |
| 55090693 | 7/1980 | Japan . |
| WO92/20856 | 11/1992 | WIPO . |
| WO96/25225 | 8/1996 | WIPO . |

OTHER PUBLICATIONS

Hatch, M. J. "Preparation and Use of Snake–Cage Polyectrolytes", Industrial and Engineering Chemistry, vol. 49m No. 11, Easton, Pa. USA, pp. 1812–1819, Nov. 1957.

M. J. Hatch et al. "Preparation and Use of Snake–Cage Polyelectrolytes"Industrial & Engineering Chemistry, vol. 49, No. 11, Nov. 1957, Easton, Pa. USA pp. 1812–1819.
Johansson et al., Svensk Papperstidning Nr. 10, 30–35, 1984.
Jiang et al., APPITA, 45 (1), 19, 1992.
Norden S. and Teder, A., Tappi, 62(7), 49–51, Jul. 1979.
Teder, A. and Olm, L. Paperi ja Puu 63(4a), 315–322, 1981.
Mao, B. and Hartler, N. Paperi ja Puu—Paper and Timber, 74(6), 491–494, 1992.
Sjoblom et al., Paperi ja Puu—Paper and Timber, 5, 452–460, 1988.
Mao, B. and Hartler, N. Nordic Pulp and Paper Research Journal, 4, 168–173, 1992.
J.E. Jiang, Tappi, 77(2), 120–124, Feb. 1994.
Nakamura, M. and Ono, T., Proceedings of the Tappi Pulping Conference, Atlanta 407, 1988.
Lightfoot, W.E. Pulp and Paper, 64(1):88, 1990.
Ryham R. and Lindberg H, 80th Annual Meeting, CPPA Technical Section, B179–B190, Feb. 1994.
Grace T.M. and Timmer, W/M. Pulp and Paper, 69(11):49 (1995).

(List continued on next page.)

*Primary Examiner*—Dean T. Nguyen
*Attorney, Agent, or Firm*—Swabey Ogilvy Renault

[57] ABSTRACT

A process using an amphoteric ion-exchange resin, also known as a "snake-cage polyelectrolyte" resin separates kraft white liquor into sulphide-rich and caustic-rich components. The sulphide-rich component can be used in the initial stage of pulping, pretreatment of wood chips prior to pulping, or it can be used to make polysulphide-rich liquor. The caustic-rich component can be used in the final delignification phase, in place of sodium hydroxide or white liquor in oxygen delignification, pH adjustment and flue gas scrubbing. The same system can be used to separate green and polysulphide liquors into sulphide-rich and sulphide-poor components, and to remove sulphide from other mill caustic streams contaminated with sulphide.

24 Claims, 5 Drawing Sheets

OTHER PUBLICATIONS

Li J. and MacLeod, J.M. Journal of Pulp and Paper Science, 19(2):J85 (1993).

Ayala et al. Tappi Oxygen Delignification Symp. Toronto, Notes: 153–161, OCt. 17–19, 1990.

Hatch et al. Industrial and Engineering Chemistry, 49(11), 1812–1819, Nov. 1957.

Rapp, J., Cellulose Chem. Technol. 5:147–159, 1971.

Milanova E & Dorris G.M., Nordic Pulp & Paper Research Journal 1:4–9, 1994.

Chanda, M and Rempel, G.L., "Sorption of sulfide on a macroporous, quaternized poly(4–vinyl pyridine) in alkaline medium," Reactive Polymers 24, pp. 203–212, (1995).

PROCESS FOR THE SEPARATION OF SULPHIDES FROM PULPING LIQUORS USING AMPHOTERIC RESINS

BACKGROUND OF THE INVENTION

1. Field of the Invention

The present invention is concerned with a process and apparatus that separates alkali metal sulphide from alkali metal hydroxide in kraft pulping liquors using a system incorporating an amphoteric type ion-exchange resin.

2. Description of Prior Art

Lignin removal by pulping is more economical and more environmentally friendly than by bleaching. Pulping to a lower kappa number is, however, associated with a loss in viscosity of the pulp. Processes such as MCC—modified continuous cooking (Johansson et al., Svensk Papperstidning nr 10, 30–35, 1984) and EMCC—extended modified continuous cooking (Jiang et al., APPITA, 45 (1), 19, 1992) have been developed to improve selectivity and maintain viscosity. It is recognized that the selectivity of the process could be improved further by applying a high sodium sulphide to sodium hydroxide ratio at the beginning of the delignification phase (Nordén, S. and Teder, A., Tappi, 62(7), 49–51, July 1979; Teder, A. and Olm, L., Paperi ja Puu 63(4a), 315–322, 1981; Mao, B. and Hartler, N., Paperi ja Puu—Paper and Timber, 74(6), 491–494, 1992). It is also recognized that a low concentration of dissolved lignin and a high alkali concentration in the final delignification phase increase the lignin removal rate (Sjoblom et al., Paperi ja Puu -Paper and Timber, 5, 452–460, 1988; Mao, B. and Hartler, N., Nordic Pulp and Paper Research Journal, 4, 168–173, 1992). Based on these findings, it is expected that the pulping process would be improved through processes that generate a sulphide-rich and a sulphide-poor liquor while maintaining the sulphur balance in the kraft process.

Extended modified cooking has also been examined in the presence of polysulphide which increases pulp yield. Extended modified cooking and polysulphide pulping are two compatible processes that offer complementary advantages (J. E. Jiang, Tappi, 77(2), 120–124, February 1994). A process that provides a high polysulphide concentration in the presence of a low concentration of hydroxide would allow further improvements of the pulping process. Polysulphide liquor is prepared from white liquor by using an activated carbon catalyst (Nakamura, M. and Ono, T., Proceedings of the Tappi Pulping Conference, Atlanta, 407, 1988; Lightfoot, W. E., Pulp and Paper, 64(1):88, 1990), or using a lime mud catalyst in the presence of $MnO_2$ (Dorris, G. M., U.S. Pat. No. 5,082,526, Jan. 21, 1992).

At present, there are five published methods of producing liquors with different sulphidities, although none has been tried on a commercial scale. These are the white liquor preparation method by H. A. Simons Ltd. (Lownertz, P. P. H., International Patent Application, W092/20856, 26 Nov. 1992), the Desulphur and Green Liquor Cooling Crystallization processes by Ahlstrom (Ryham, R. and Lindberg, H., 80th Annual Meeting, CPPA Technical Section, B179–B190, Feb. 1994), black liquor gasification (Grace, T. M. and Timmer, W./M., Pulp and Paper, 69(11):49 (1995)), and separation of sulphides and chlorides from pulping liquors by electrodialysis by Paprican (Thompson et al, U.S. Pat. No. 5,536,384, Jul. 16, 1996 and International Patent Application, Wo 96/25225, Aug. 22, 1996).

Apart from pulping, white liquor is also used as a source of alkali in oxygen delignification. The white liquor used is oxidized prior to oxygen delignification to convert the $Na_2S$ content to $Na_2S_2O_3$ (partial oxidation) or $Na_2SO_4$ (full oxidation). Since the effluent from an oxygen delignification stage is compatible with the kraft recovery cycle and can be recycled to the recovery boiler, oxidized white liquor is used in place of purchased caustic soda to maintain the mill sodium/sulphur balance. If oxidized white liquor is used as a source of alkali in bleaching extraction stages, peroxide bleaching and/or brightening, alkaline leaching (Li, j and MacLeod, J. M., Journal of Pulp and Paper Science, 19(2):j85 (1993)) or scrubbing applications, complete oxidation of alkali metal sulphide to alkali metal sulphate is required (Ayala etal, Tappi Oxygen Delignification Symp., Toronto, Notes: 153–161, Oct.17–19, 1990). This is to prevent the consumption of bleaching chemicals and the emission of TRS gases in scrubbing applications. Complete oxidation of white liquor involves considerable capital and operating costs. The present invention provides an efficient way to separate alkali metal sulphide from white liquor without the production of alkali metal thiosulphate or sulphate. The resulting caustic soda solution is compatible with the bleaching and scrubbing operations. Furthermore, the operating costs of such a process are much lower than the oxidation of white liquor, since it uses water to achieve the separation.

Amphoteric ion-exchange resins also referred to as snake-cage polyelectrolyte resins operate on the principle of ion retardation and are particularly useful in removing salts from aqueous solutions of non-electrolytes, and for separating metal ions or anions. A snake-cage resin is a cross-linked polymer system containing a physically trapped linear polymer "a snake". Because of its high molecular weight, the snake cannot diffuse out of the highly cross-linked cage. The snake-cage resin corresponds to a microscopically mixed ion-exchange bed, the mixing being on the molecular level, (Hatch et al, Industrial and Engineering Chemistry, 49(11), 1812–1819, Nov. 1957). The cation-exchange sites of the resin are very close to the anion-exchange sites—probably in the range of 10 A or less. Thus the resin system is already internally neutralized. Therefore, if sodium chloride is fed through a column containing such a resin, the resin sorbs both the sodium and chloride ions simultaneously, weakly and reversibly. Sorbed salts can be removed from such a resin by merely washing with water. When this resin is used in a resin bed, many water-soluble ionic and non-ionic materials can be separated merely by feeding a certain volume of the solution to the amphoteric resin bed and subsequently rinsing the bed with water. As the ionic materials are weakly sorbed, they appear in the later fractions of the eluate. Since the movement of ionic materials on the resin bed is retarded, this separation method is called ion retardation. Such a separation approach corresponds to a many-stage fractionation, and often can separate ionic and non-ionic materials very efficiently. The ionic materials can diffuse freely throughout all the water-swollen inner region of the resin particles and the capacity is very much greater than would be the case if only surface sites were involved.

These resins are often many times more selective for one ionic species than for another. These differences in ion-selectivities often make it possible to fractionate mixtures of ionic materials. For example, the polyacrylate Dowex (trade-mark of Dow Chemical) 11A8 snake-cage resin is much more selective for sodium chloride than for sodium hydroxide. This selectivity can be exploited in removing sodium chloride—a contaminant—from caustic solutions containing sodium chloride. Although the high selectivity of the snake-cage resin for chloride has been documented before (Hatch et al, Industrial and Engineering Chemistry, 49 (11), 1812–1819, Nov. 1957), there are no published data on the selectivity of this resin to sodium sulphides.

Although amphoteric ion-exchange resins are normally used in particulate form, an amphoteric ion-exchange resin may be made in the form of a membrane for use in diffusion dialysis. In such a case, water is used to strip sulphide/polysulphide from the membrane. The diffusion dialysis process using amphoteric ion-exchange membrane is the equivalent of ion-retardation in a fixed bed.

SUMMARY OF THE INVENTION

It is a general object of the invention to provide a process and apparatus for separating a sulphur-containing component from a pulp liquor.

It is a particular object of this invention to provide a process for the separation of alkali metal sulphide from alkali metal hydroxide in white liquor used in kraft pulping.

It is another particular object of this invention to provide a process for the separation of alkali metal sulphide from alkali metal carbonate and alkali metal hydroxide in green liquor. Green liquor is the liquor which upon causticizing yields white liquor.

It is still a further particular object of this invention to provide a process for the separation of alkali metal polysulphide from alkali metal hydroxide in polysulphide liquor. Polysulphide liquor is produced through the oxidation of white liquor in the presence of a catalyst, and it can be used in the kraft pulping process to improve yield.

It is a still further particular object of this invention to provide a process for the removal of alkali metal sulphide and/or alkali metal thiosulphate from partially-oxidized white liquor used in oxygen delignification.

It is yet another particular object of this invention to provide a process for the removal of alkali metal sulphide from any other pulp mill caustic solution contaminated with alkali metal sulphide.

In the present invention an amphoteric ion exchange resin, otherwise known as a "snake-cage polyelectrolyte" resin is employed, which permits the separation of a pulp liquor into sulphide-rich and sulphide poor components. This approach is simpler and more economical than the prior methods described hereinbefore of producing liquors with different sulphidities.

It has now been found that alkali metal sulphide or polysulphide is picked up by this resin in preference to alkali metal hydroxide, allowing the separation of pulping liquors into sulphide-rich and sulphide-poor components.

In accordance with the invention there is provided a process for separating a sulphur-containing component from a pulp liquor comprising:

i) feeding a pulp liquor containing a sulphur-containing component selected from alkali metal sulphide, polysulphide or alkali metal thiosulphate through an amphoteric ion-exchange resin, ii) sorbing said sulphur-containing component onto said resin from said liquor, iii) recovering the liquor depleted in said sulphur-containing component from said resin, and, subsequently, iv) eluting the sorbed sulphur-containing component from said resin.

In accordance with another aspect of the invention there is provided in a kraft pulping apparatus including, in combination, a digestor for digestion of wood with a pulping liquor, a recovery boiler for receiving spent liquor from said digestor, a smelt tank for receiving smelt from said recovery boiler and generating a pulp liquor, a causticizer for generating pulping liquor from the pulp liquor generated in said smelt tank, and means communicating said causticizer with said digestor for delivery of pulping liquor from said causticizer to said digestor, the improvement comprising, an ion-exchange unit housing an amphoteric resin selective for sodium sulphide in communication with said combination, for receiving a liquor containing sodium sulphide from within said combination, means for recovering liquor depleted in sodium sulphide from said ion-exchange unit, and means for eluting sodium sulphide from the ion-exchange unit.

DESCRIPTION OF PREFERRED EMBODIMENTS

The amphoteric ion-exchange resins are also described as "snake-cage polyelectrolyte" resins (Hatch et al, Industrial and Engineering Chemistry, 49(11), 1812–1819, Nov. 1957). Several types of amphoteric ion-exchange resins can be used, although the preferred type is that described by Hatch, (U.S. Pat. No. 3,041,292, Jun. 26, 1962) in which acrylic acid is polymerized inside a quaternary amine strong base anion-exchange resin. This type of resin may be defined as a granular amphoteric agent, individual granules of which are each an insoluble composite body of at least two closely associated solid resin ingredients. One of these ingredients contains cation-exchange groups and another ingredient contains anion-exchange groups. A more specific definition is a bead form of polystyrene cross-linked with divinylbenzene and having nuclear substituted quaternary trialkyl ammonium groups, wherein said quaternary ammonium groups are neutralized by carboxylic acid groups which exist on chains of polyacrylic acid entrapped within the resin beads (see U.S. Pat. No. 3,078,140, Feb. 19, 1963 by M. J. Hatch and U.S. Pat. No. 4,235,717, Nov. 25, 1980, by Lee et al).

In one preferred embodiment there is provided a process for separating kraft white liquor into a sulphide-rich solution and a caustic-rich solution comprising: i) feeding kraft white liquor into an ion-exchange unit also known as ion-retardation unit (IRU) equipped with or housing an amphoteric ion-exchange resin, ii) sorbing the alkali metal sulphide component of the white liquor with the resin with rejection of alkali metal hydroxide, carbonate or sulphate to produce a caustic-rich solution, and iii) eluting alkali metal sulphide sorbed onto the resin of said IRU with water to recover a sulphide-rich liquor.

In accordance with another embodiment of the invention there is also provided a process for separating kraft green liquor into a sulphide-rich solution and a carbonate-rich solution comprising: i) feeding kraft green liquor into an ion-retardation unit (IRU) equipped with or housing an amphoteric ion-exchange resin, ii) sorbing the alkali metal sulphide component of the green liquor with the resin with rejection of alkali metal carbonate, hydroxide or sulphate to produce a carbonate-rich solution, and iii) eluting alkali metal sulphide sorbed onto the resin of said IRU with water to recover a sulphide-rich liquor.

In accordance with yet another embodiment of the invention there is also provided a process for separating kraft polysulphide liquor into a polysulphide-rich solution and a polysulphide-poor solution comprising: i) feeding polysulphide liquor into an IRU equipped with or housing an amphoteric ion-exchange resin, ii) sorbing an alkali metal polysulphide/sulphide component of the liquor with the resin with rejection of alkali metal hydroxide, carbonate or sulphate to produce a polysulphide-poor solution, and iii) eluting alkali metal polysulphide sorbed onto the resin of said IRU with water to recover a polysulphide-rich liquor.

In accordance with still another embodiment of the invention, there is also provided a process for removing sulphide and/or thiosulphate from oxidized white liquor comprising: i) feeding oxidized white liquor into an IRU equipped with or housing an amphoteric ion-exchange resin, ii) sorbing the alkali metal sulphide and/or thiosulphate components of the oxidized white liquor with the resin with rejection of alkali metal hydroxide, sulphate or carbonate to produce a sulphide/thiosulphate-poor liquor, and iii) eluting alkali metal sulphide/thiosulphate sorbed into said IRU unit with water to recover a sulphide/thiosulphate-rich solution.

In accordance with yet another embodiment of the invention, there is also provided a process for removing sulphide from any caustic solution contaminated with sulphide in a pulp mill, e.g. spent scrubber solutions, comprising: i) feeding sulphide-containing alkali solution into an IRU equipped with or housing an amphoteric ion-exchange resin, ii) sorbing the alkali metal sulphide component of the solution with the resin with rejection of alkali metal hydroxide, sulphate or carbonate to produce a sulphide-poor liquor, and iii) eluting alkali metal sulphide sorbed into said IRU unit with water to recover a sulphide-rich solution.

DETAILED DESCRIPTION OF PREFERRED EMBODIMENTS OF THE INVENTION WITH REFERENCE TO THE DRAWINGS

Figure 1:
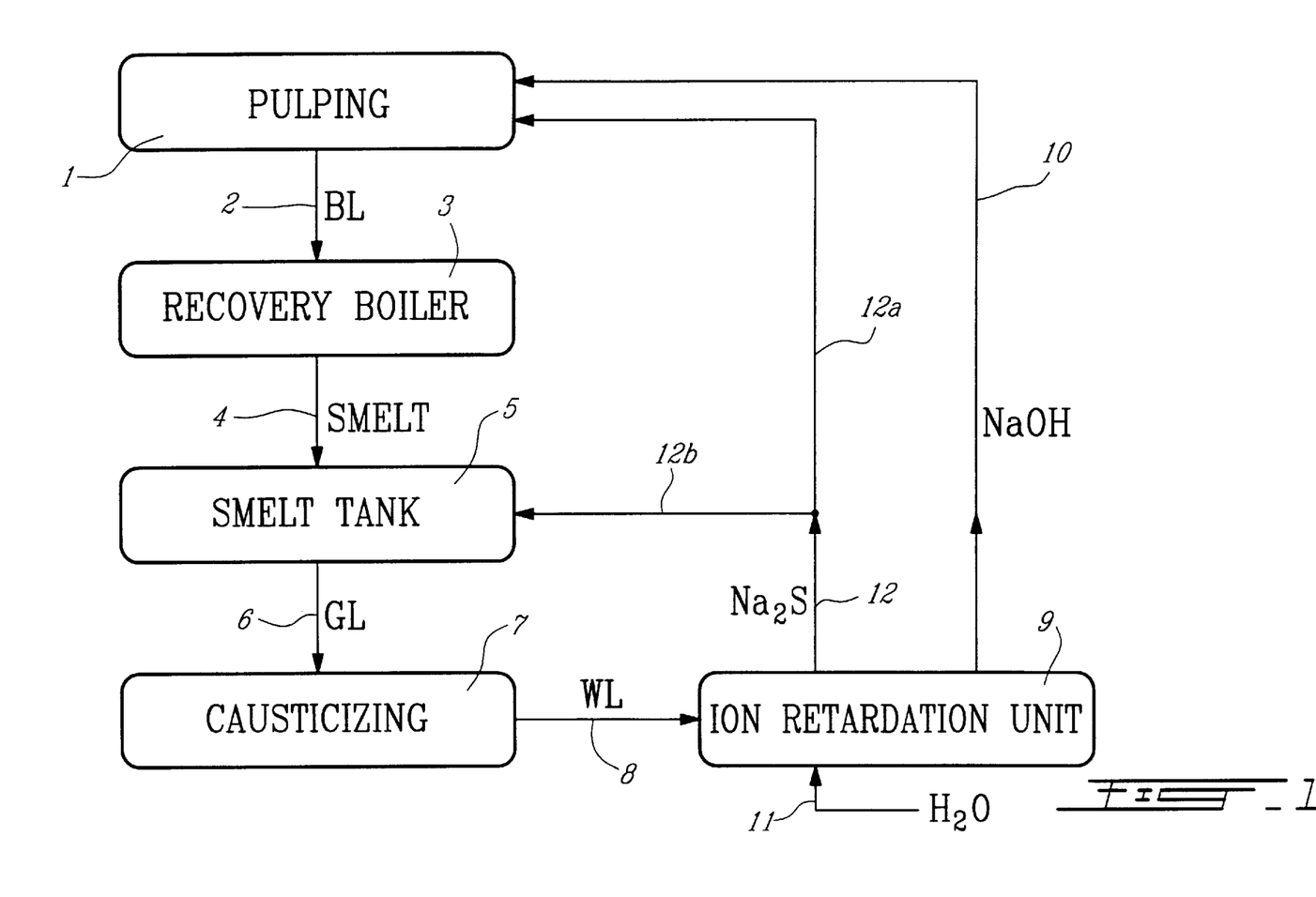
FIG. 1 is a schematic illustration of the basic embodiment of the invention where white liquor is passed through an ion-retardation unit (IRU) employing an amphoteric ion-exchange resin which is selective to alkali metal sulphide while rejecting alkali metal hydroxide.

FIG. 1 illustrates the process of the invention and the principal operations in a kraft pulping process. Wood is converted to pulp in a digester using white liquor; this process is known as pulping, 1. The spent liquor known as black liquor, 2 is concentrated and burnt in a recovery boiler, 3, producing smelt (mainly $Na_2S$ and $Na_2CO_3$) and flue gas. The smelt, 4 is directed to a smelt tank, 5 where water and/or weak wash is added to obtain green liquor, 6, which is then clarified. The green liquor is causticized, 7 with lime to convert $Na_2CO_3$ to NaOH. The resulting white liquor, 8 is filtered to produce clarified white liquor which is used in pulping. In this invention, white liquor, 8 is fed into an IRU, 9 equipped with an amphoteric ion-exchange resin wherein the alkali metal sulphide component of white liquor is sorbed by the resin, leaving a caustic-rich white liquor, 10 which can be used in the final stage of pulping or in the place of caustic in other mill applications. The alkali metal sulphide sorbed onto the resin of said IRU is eluted with water, 11 to recover a sulphide-rich liquor, 12 which can be used in the initial stage of pulping, pretreatment of wood chips prior to pulping or it can be converted to polysulphide-rich liquor to help increase yield in pulping. Since the sulphide component is eluted with water, more water is introduced to the process than originally contained in the white liquor. This problem can be addressed by vacuum evaporation of the sulphide-rich stream or by adding a portion of the sulphide-rich stream, 12b to the smelt tank instead of water. The resulting green liquor which has a higher concentration of sulphide will be converted to a sulphide-rich white liquor upon causticization (FIG. 1). The sulphide-rich white liquor is then separated to sulphide-rich and caustic-rich components. A portion of the sulphide-rich stream is subsequently recycled to the smelt tank, thereby acting as a dead load in the smelt tank-causticizer-IRU loop, described above. The final concentration of sulphide in the green liquor and the sulphide-rich stream from the IRU will be dependent upon the portion of sulphide that is recycled back to the smelt tank.

Preferably, the feed solution should be free of large amounts of suspended solids. The problems arising from high levels of suspended solids can be addressed by efficient filtration of the pulping liquors.

Figure 2:
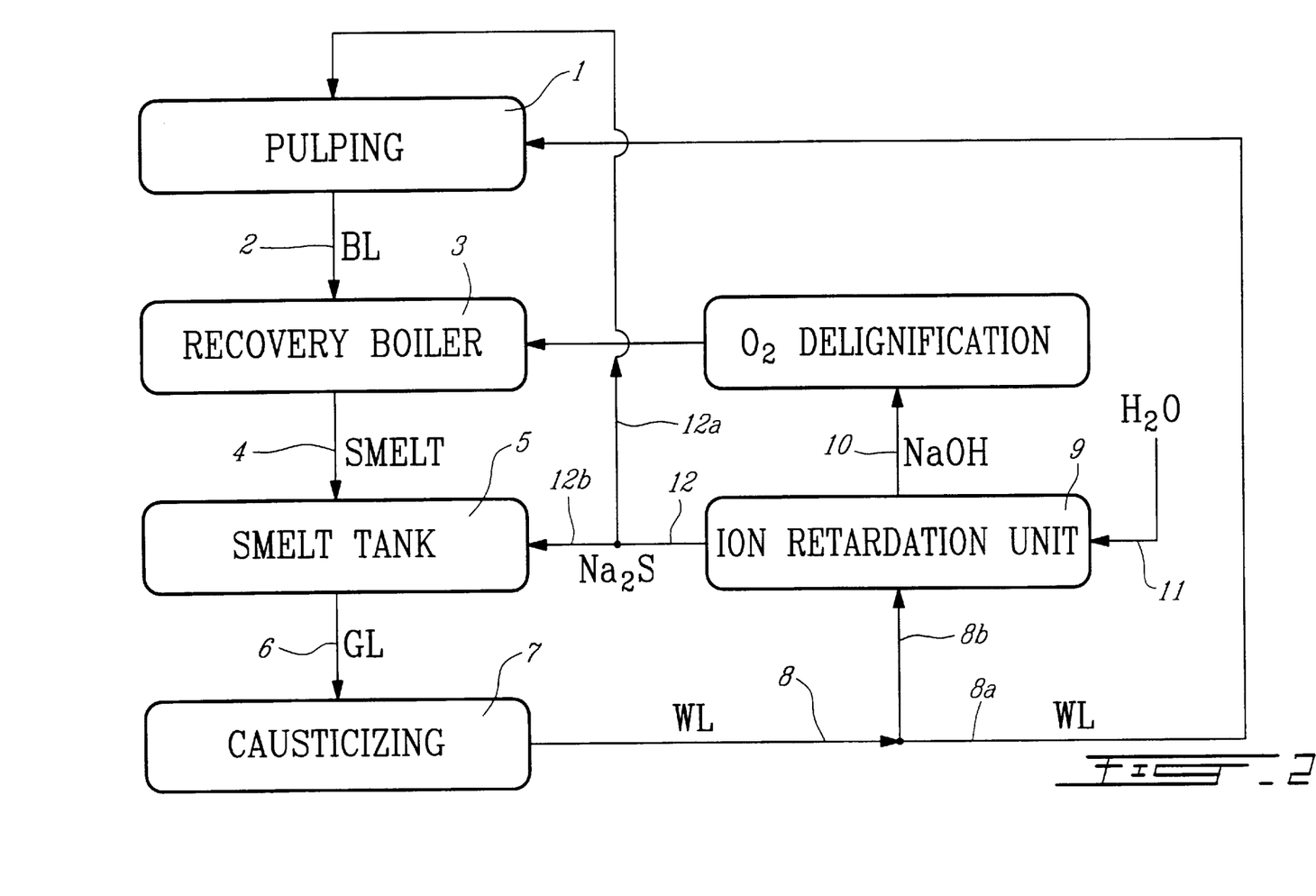
FIG. 2 illustrates a second embodiment of the invention where a portion of white liquor is passed through the same IRU to produce sufficient caustic-rich liquor for oxygen delignification.

FIG. 2 shows a second embodiment of the invention where a portion of white liquor, 8b is fed into the same IRU to recover caustic, 10 for an oxygen delignification stage. The sulphide-rich portion, 12 can be used for the pretreatment of wood chips prior to pulping, the initial stage of pulping or it can be converted to polysulphide liquor; alternatively, the sulphide-rich portion, 12 can be recycled to the smelt tank, 5. In this case, the resulting sulphide-rich green liquor is converted to a sulphide-rich white liquor, a portion of which is processed through the IRU and the larger portion is used in pulping.

Figure 3:
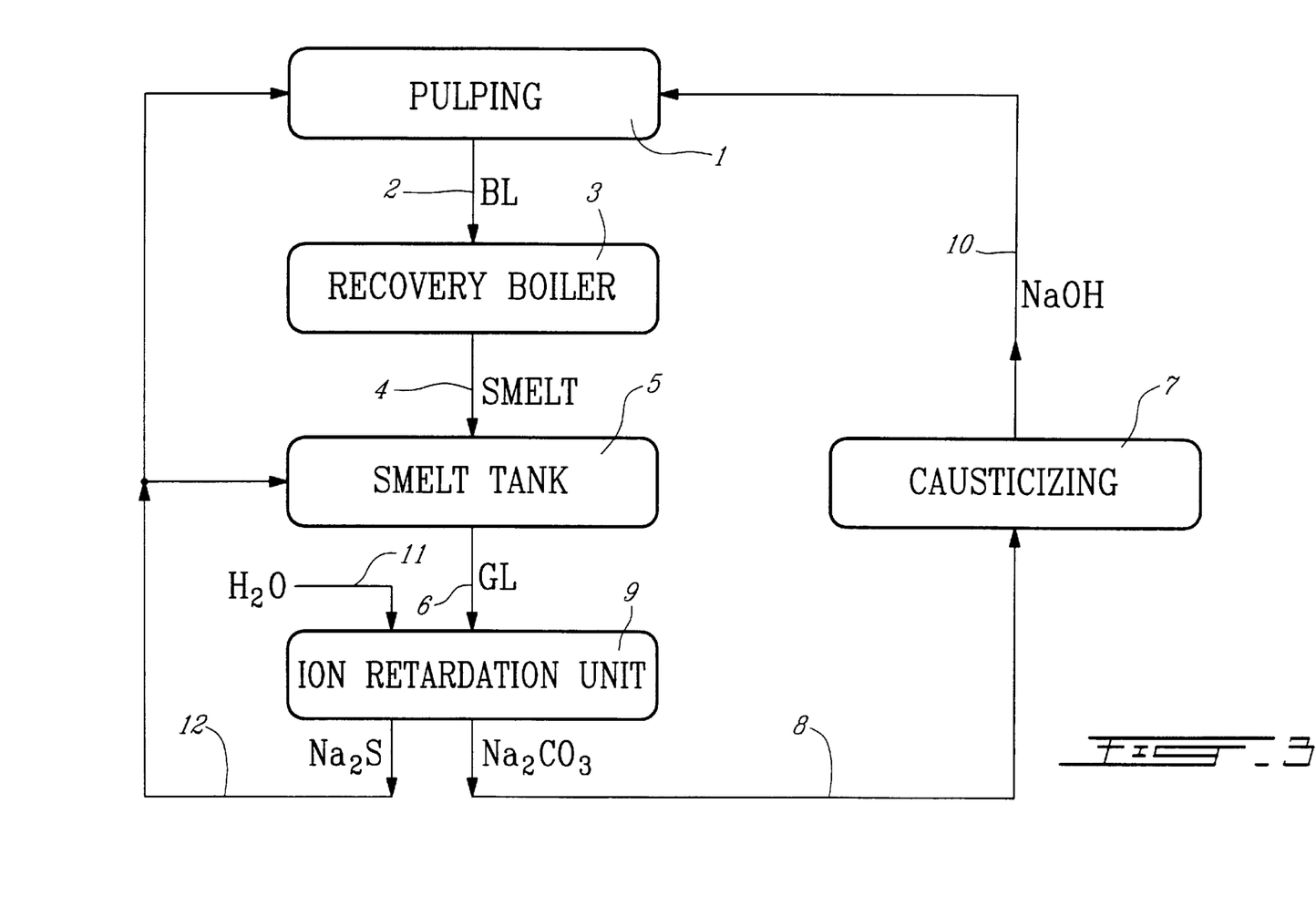
FIG. 3 illustrates a third embodiment of the invention where green liquor is passed through the same IRU employing an amphoteric ion-exchange resin which is selective to alkali metal sulphide while rejecting alkali metal carbonate.

In a third embodiment, green liquor, 6 can be processed through the same system to produce a carbonate-rich, 8 and a sulphide-rich, 12 solution. The carbonate-rich component will produce a caustic-rich white liquor, 10, at higher efficiency, upon causticization, 7, (FIG. 3).

Figure 4:
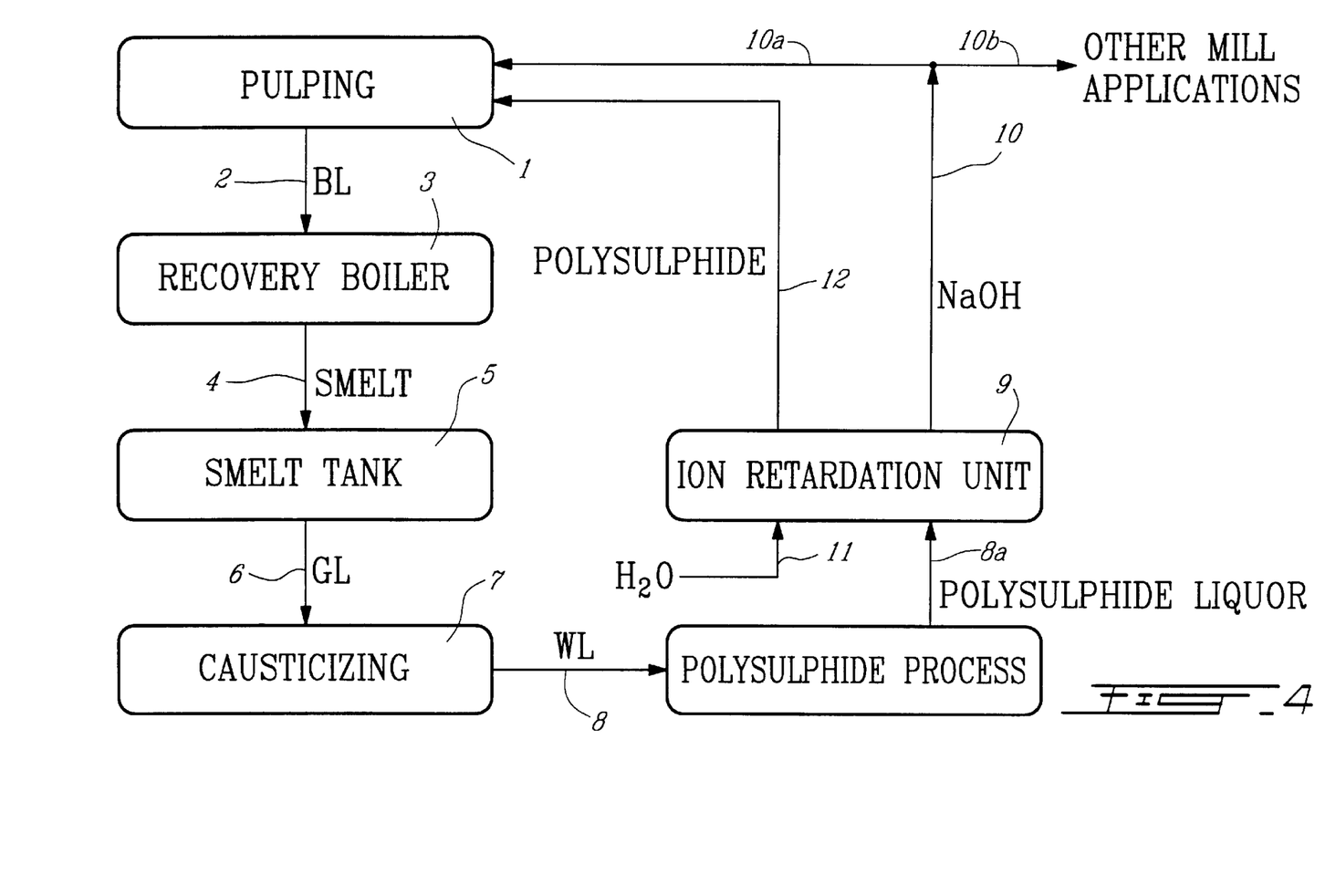
FIG. 4 illustrates a fourth embodiment of the invention where polysulphide liquor is passed through the same IRU employing an amphoteric ion-exchange resin which is selective to alkali metal polysulphide while rejecting alkali metal hydroxide .

In a further embodiment of this invention (FIG. 4), white liquor, 8 is converted to polysulphide liquor, 8a which is fed into the same IRU, 9 described earlier, wherein the polysulphide component of the polysulphide liquor is sorbed by the resin, leaving a caustic-rich liquor, 10. The alkali metal polysulphide sorbed onto said ion-exchange resin is eluted with water, 11 to recover a polysulphide-rich liquor, 12. The polysulphide-rich component can be used in extended delignification to help increase yield and the caustic-rich component can be used in the final stage of delignification or in place of caustic in other mill applications.

Figure 5:
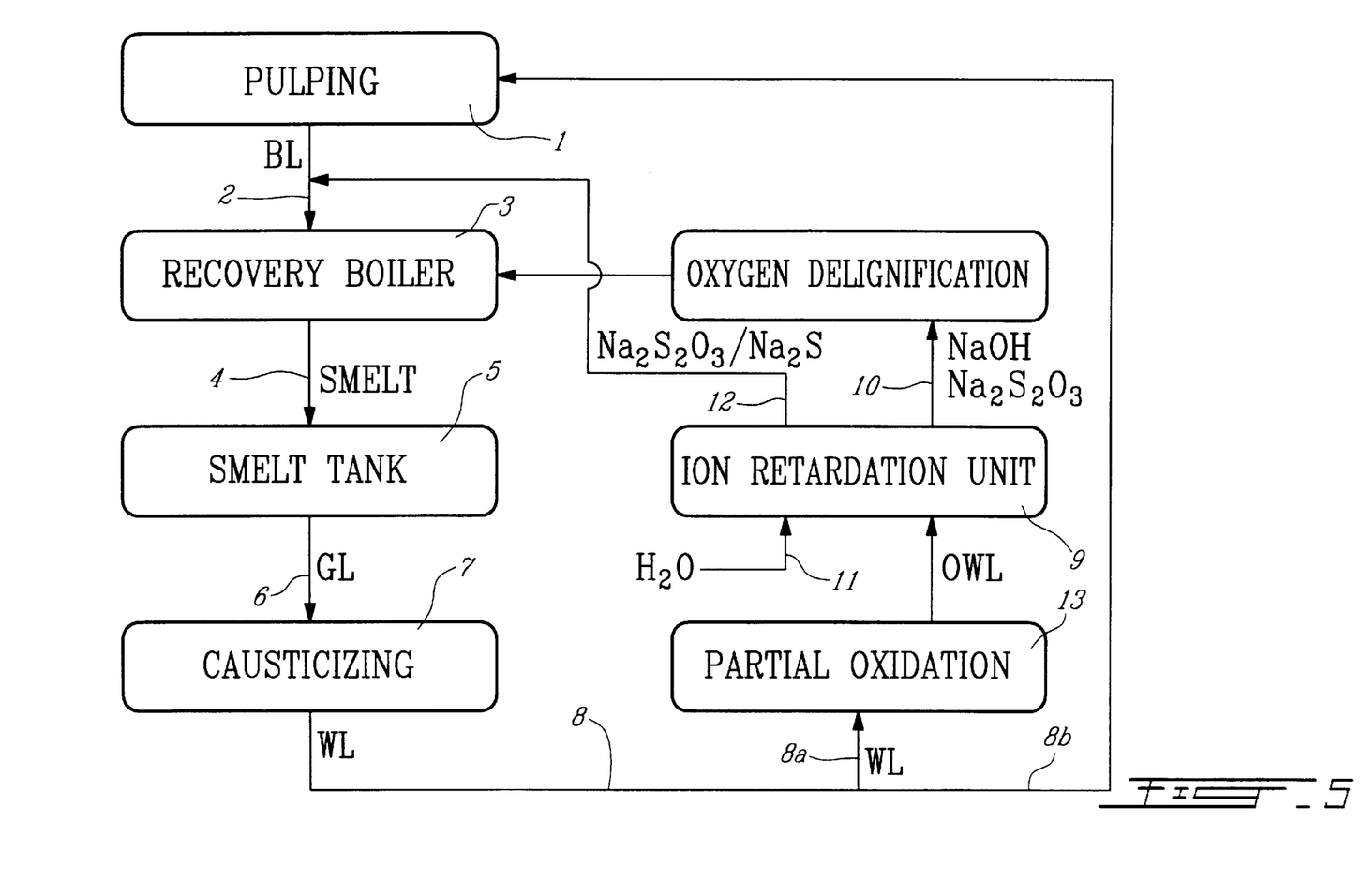
FIG. 5 illustrates a fifth embodiment of the invention where oxidized white liquor containing sulphide and thiosulphate is passed through the same IRU employing an amphoteric ion-exchange resin which is selective to alkali metal sulphide/thiosulphate while rejecting alkali metal hydroxide.

In another embodiment of this invention (FIG. 5), a partially-oxidized white liquor, 8a can be processed through the same IRU, 9 to produce a sulphide/thiosulphate-rich and a sulphide/thio-sulphate-poor liquor. The sulphide/ thiosulphate-rich solution, 12 can be recycled back to black liquor, 2, before the recovery boiler, whereas the sulphide/thiosulphate-poor, caustic-rich liquor, 10 can be used in the process thereby reducing the consumption of oxygen in the oxygen delignification process.

can be used to make polysulphide liquor. The caustic-rich (sulphide-poor)liquor can be used in the final stage of pulping or in the place of sodium hydroxide in oxygen delignification, bleaching extraction stage, alkaline leaching, peroxide bleaching and/or brightening, pH adjustment and scrubbing applications.

TABLE 1

Separation of mill white liquor into sulphide-rich and caustic-rich components

|  | Volume L | MOH M | $M_2S$ M | $M_2CO_3$ M | $M_2SO_4$ M | Cl g/L | Na g/L | K g/L | Ca ppm | Fe ppm |
|---|---|---|---|---|---|---|---|---|---|---|
| Feed | 0.62 | 2.07 | 0.68 | 0.34 | 0.11 | 2.2 | 97 | 10 | 8.5 | 2.4 |
| Eluate (sulphide-rich) | 0.62 | 0.0 | 0.67 | 0.01 | 0.02 | 2.4 | 28 | 3 | 0.8 | 0.3 |
| Caustic-rich | 0.62 | 2.01 | 0.02 | 0.34 | 0.10 | 0.0 | 65 | 6 | 6.8 | 0.9 |

* M represents both Na and K

In the final embodiment of this invention, caustic solutions used in the mill (i.e., spent scrubbers solutions) which are contaminated with sulphide can be processed through the same ion-exchange resin bed to produce a sulphide-rich and a sulphide-poor liquor. The sulphide-poor, caustic-rich solution can be recycled back to the process, whereas the sulphide-rich solution can be used as makeup for the sulphide-rich stream in extended delignification (if it is not contaminated with undesirable chemicals), can be returned to recovery cycle (if high sulphidity is not a problem) or it can be treated and discarded.

The temperature of the pulping liquors and spent alkaline solutions, as well as water feed to the IRU may be any temperature compatible with the resin and above the freezing and/or precipitation point of the solutions, preferably in the 20–90° C. temperature range. The upper limit is compatible with the temperature of pulping liquors used in kraft mills.

The divalent salts (i.e., $Na_2SO_4$ and $Na_2CO_3$) in pulping liquors are not sorbed by the resin and, therefore, end up in the sulphide-poor stream.

EXAMPLES

EXAMPLE 1

This example illustrates the separation of alkali metal sulphide from a mill white liquor. A mill clarified white liquor at 75° C. was filtered and fed to the bottom of an IRU containing a bed of amphoteric ion-exchange resin measuring 2' in diameter and 24' in height. The amphoteric ion-exchange resin was prepared by polymerizing acrylic acid inside a quaternary amine strong base anion-exchange resin according to the method described by M. J. Hatch in U.S. Pat. No. 3,041,292, Jun. 26, 1962, the teachings of which are incorporated herein by reference. After the displacement of the void of water, a sulphide-depleted (caustic-rich) solution was collected. In the next step, water at 80 ° C. was fed to the top of the ion-exchange resin bed. After displacing the entrained void of feed solution from the bed, the eluate was collected from the bed. The average flow rate of the solution passed through the bed was approximately 0.16 L/min. The cycle was repeated several times and samples of the sulphide-rich and caustic-rich liquors were collected and analyzed once the system had reached steady-state operation. The experimental results are shown in Table 1.

The sulphide-rich liquor can be used in wood pretreatment prior to pulping, the initial stage of pulping, or it As shown in Table 1, approximately 98% of alkali metal sulphide was removed from the white liquor whereas 96% of the alkali metal hydroxide was recovered. The hydroxide loss to the sulphide stream was almost zero and the sulphide loss to the hydroxide stream was about 2%. With respect to non-process elements such as K, Cl, Ca and Fe, the distribution is shown in Table 1. With the exception of Cl and K, Ca ends up mainly in the caustic-rich stream. The poor mass balance for iron indicates that the filter used for white liquor removed some of the insoluble iron compounds. The feed white liquor can be processed through a drum filter or a pressure filter to remove suspended solids which are mainly the sulphides, hydroxides and carbonates of multivalent cations. This provides a partial purge for some of the non-process elements in the recovery cycle. Chloride is picked up by the resin and ends up in the sulphide-rich stream.

The above system was also operated at room temperature, separating white liquor into sulphide-rich and caustic-rich components. A noticeable difference was observed in the cycle time, i.e., a shorter cycle time was obtained for the experiment conducted at 75° C. A shorter cycle time (or higher feed flow rate) means that a smaller unit would be required to achieve the same degree of separation, resulting in a lower capital cost.

The standard kraft pulping terms are defined as follows: Effective Alkali (EA) is NaOH+½ $Na_2S$, expressed as g $Na_2O$/L; Active Alkali (AA) is NaOH+$Na_2S$, expressed as g $Na_2O$/L; Total Titratable Alkali (TTA) is NaOH+$Na_2S$+$Na_2CO_3$, expressed as g $Na_2O$/L and Sulphidity is the ratio of $Na_2S$ to AA or TTA in % on $Na_2O$ basis. The mill white liquor and the samples taken from the IRU were analyzed at room temperature, according to the following procedures: sulphide concentration was measured by potentiometric titration with mercuric chloride, using a sulphide-selective electrode (Rapp, J., Cellulose Chem. Technol., 5:147–159, 1971). The EA and TTA were determined through a conductometric titration using hydrochloric acid as the titrant [Milanova, E. and Dorris, G. M., Nordic Pulp and Paper Research Journal, 1:4–9, 1994)]; AA was calculated based on the difference between EA and sodium sulphide content. The difference between TTA and AA is assumed to be alkali-metal carbonate. Divalent anions were measured using Ion Chromatography (IC); sodium and potassium were measured by Atomic Absorption (AA) spectroscopy. Other metals were measured by Inductively Coupled Plasma (ICP) spectroscopy.

EXAMPLE 2

This example illustrates the separation of alkali metal sulphide from a mill green liquor. Mill clarified green liquor at room temperature was filtered and fed to the bottom of the ion-retardation unit used in Example 1. After the displacement of the void of water, a sulphide-depleted (carbonate-rich) solution was collected. In the next step, water was fed to the top of the ion-exchange resin bed. After displacing the entrained void of feed solution from the bed, the sulphide-rich eluate was collected from the bed. The average flow rate of the solution passed through the bed was approximately 0.08 L/min. The composition of the mill green liquor and the experimental results are shown in Table 2.

The concentration of polysulphide (PS), expressed as sulphur (S) concentration was measured by a gravimetric method. In this method, a known volume of polysulphide liquor is acidified with hydrochloric acid (pH=5–5.5) and the precipitated sulphur is then filtered, dried and weighed to determine the amount of polysulphide sulphur.

This experiment demonstrates that polysulphide liquor can be separated into a polysulphide-rich liquor and a polysulphide-poor (caustic-rich) liquor. The polysulphide-rich liquor can be used in extended delignification to help increase yield, whereas the polysulphide-poor liquor (caustic-rich) can be used in the final stage of pulping or it can be used in place of sodium hydroxide in other mill applications.

TABLE 2

Separation of mill green liquor into sulphide-rich and carbonate-rich components

| | Volume L | MOH M | $M_2S$ M | $M_2CO_3$ M | $M_2SO_4$ M | Cl g/L | Na g/L | K g/L | Ca ppm | Fe ppm |
|---|---|---|---|---|---|---|---|---|---|---|
| Feed | 0.63 | 0.31 | 0.67 | 0.91 | 0.06 | 1.9 | 82 | 9 | 5.2 | 2 |
| Eluate (sulphide-rich) | 0.63 | 0.0 | 0.64 | 0.0 | 0.01 | 2.0 | 21 | 3 | 0.6 | 0.3 |
| Carbonate-rich | 0.64 | 0.30 | 0.05 | 0.88 | 0.05 | 0.0 | 52 | 6 | 3.7 | 0.3 |

* M represents both Na and K

As shown in Table 2, approximately 95% of alkali metal sulphide was removed from the green liquor whereas almost all of the alkali metal carbonate and hydroxide were recovered. The carbonate and hydroxide loss to the sulphide stream was almost zero and the sulphide loss to the carbonate stream was about 5%. With respect to the non-process elements such as K, Cl, Ca and Fe, the distribution is shown in Table 2. The low levels of Ca and, in particular, Fe in the sulphide-rich and carbonate-rich streams indicate the beneficial effect of filtering. With the exception of Cl and K, the rest of these elements end up in the carbonate-rich stream.

This experiment demonstrates that green liquor can be separated into a sulphide-rich liquor and a carbonate-rich liquor. The sulphide-rich liquor can be used in wood chips pre-treatment before pulping, the initial stage of pulping, or it can be used to make polysulphide liquor. The carbonate-rich (sulphide-poor)liquor can be causticized (at higher efficiency) to a caustic-rich white liquor, which can be used in the final stage of pulping or in the place of sodium hydroxide in other mill applications.

EXAMPLE 3

This example illustrates that polysulphide liquor can be separated into a polysulphide-rich and a caustic-rich component. A laboratory-made polysulphide liquor was prepared by dissolving elemental sulphur in a mixture of sodium sulphide and sodium hydroxide. The IRU used was the same as the one used in Example 1. The polysulphide liquor was filtered and fed to the bottom of an IRU containing a bed of amphoteric ion-exchange resin. After the displacement of the void of water, a polysulphide-depleted (caustic-rich) solution was collected. In the next step, water was fed to the top of the ion-exchange resin bed. After displacing the entrained void of feed solution from the bed, the polysulphide-rich eluate was collected from the bed. The average flow rate of the solution passed through the bed was approximately 0.11 L/min. The composition of polysulphide liquor and the experimental results are shown in Table 3. The hydroxide recovery was 98% whereas the polysulphide recovery was 86%. The discrepancy in polysulphide and sulphide mass balance is expected to be due to the fact that some polysulphide/sulphide was retained on the resin and was not completely eluted with water in the time available during the elution step. The polysulphide recovery can be improved by prolonging this step and/or using water (may contain an electrolyte) of a higher temperature.

TABLE 3

Separation of polysulphide liquor into polysulphide-rich and caustic-rich components

| | Volume L | MOH M | $M_2S$ M | PS g/L S | Cl g/L |
|---|---|---|---|---|---|
| Feed | 0.88 | 2.202 | 0.12 | 7.36 | 2.0 |
| Eluate (Polysulphide-rich) | 0.88 | 0.036 | 0.10 | 6.30 | 2.0 |
| Caustic-rich | 0.87 | 2.168 | 0.00 | 0.0 | 0.0 |

* M represents both Na and K

EXAMPLE 4

This example illustrates that alkali metal thiosulphate can be removed from oxidized white liquor. A laboratory-made, partially-oxidized white liquor was prepared and fed to the bottom of an IRU containing a bed of amphoteric ion-exchange resin. The IRU used was the same as the one used in Example 1. After the displacement of the void of water, a thiosulphate-depleted (caustic-rich) solution was collected. In the next step, water was fed to the top of the ion-exchange resin bed. After displacing the entrained void of feed solution from the bed, the thiosulphate-rich eluate was collected from the bed. The average flow rate of the solution passed through the bed was approximately 0.11 L/min. The composition of oxidized white liquor and the experimental results are shown in Table 4. The hydroxide recovery was 100% whereas the thiosulphate removal was about 33%. The discrepancy in mass balance for thiosulphate is probably due to the fact that a small amount of thiosulphate was retained on the resin and was not completely eluted with water in the time available during the elution step. The thiosulphate removal can be improved by prolonging this step, using more water and/or operating at a higher temperature. The removal of thiosulphate from oxidized white liquor may provide a purge for mills which have a high sulphidity problem or if thiosulphate is a problem in liquor handling equipment. Removal of sulphide residue and partial removal of thiosulphate will also decrease the oxygen consumption in the delignification process.

TABLE 4

Removal of thiosulphate from oxidized white liquor

|  | Volume L | MOH M | $M_3S_2O_3$ M |
|---|---|---|---|
| Feed | 1.24 | 2.85 | 0.38 |
| Eluate (thiosulphate-rich) | 0.71 | 0.0 | 0.22 |
| Caustic-rich | 1.24 | 2.85 | 0.23 |

* M represents both Na and K

We claim:

1. A process for separating a sulphur-containing component from a pulp liquor comprising:
   i) feeding a first volume of a pulp liquor containing a sulphur-containing component selected from alkali metal sulphide, polysulphide or alkali metal thiosulphate through an amphoteric ion-exchange resin, housed in an ion exchange unit, said first volume being fed through said unit in a first flow direction,
   ii) sorbing said sulphur-containing component onto the resin in said unit from said first volume of pulp liquor,
   iii) recovering the liquor depleted in said sulphur-containing component flowing in said first flow direction from said unit, and, subsequently,
   iv) eluting the sorbed sulphur-containing component from said resin in said unit with a second volume of eluting water flowing through said unit in a second flow direction which is a counterflow direction to said first flow direction, said second volume being not greater than said first volume.

2. A process for separating an alkali metal sulphide from a kraft pulping liquor comprising:
   a) feeding a first volume of kraft pulping liquor containing alkali metal sulphide into an ion-exchange unit housing an amphoteric ion-exchange resin, said first volume being fed through said unit in a first flow direction;
   b) sorbing said alkali metal sulphide onto said resin in said unit from said first volume of liquor;
   c) recovering an alkali metal sulphide depleted pulping liquor flowing in said first flow direction from the ion-exchange unit, and subsequently
   d) removing an alkali metal sulphide containing solution from the said ion-exchange unit by water elution by flowing a second volume of eluting water through said unit in a second flow direction which is a counterflow direction to said first flow direction, said second volume being not greater than said first volume.

3. A process according to claim 2, wherein said ion-exchange resin is a granular amphoteric ion-exchange medium, individual granules of which are each an insoluble composite body of at least two closely associated ingredients, including an insoluble cross-linked resin, one of said ingredients containing cation exchange groups and the other containing anion-exchange groups.

4. A process according to claim 3, wherein the amphoteric ion-exchange resin is a bead form of polystyrene cross-linked with divinylbenzene and having nuclear substituted quaternary trialkyl ammonium groups, wherein said quaternary ammonium groups are neutralized by carboxylic acid groups which exist on chains of polyacrylic acid entrapped within the resin beads.

5. A process according to claim 2, wherein said liquor in a) is clarified white liquor from a kraft pulp mill, said amphoteric ion-exchange resin selectively sorbing alkali metal sulphide while rejecting alkali metal hydroxide, and step c) comprises recovering an alkali-metal hydroxide solution from said unit.

6. A process according to claim 5, wherein a portion of white liquor from a kraft pulp mill is processed to produce caustic soda for an oxygen delignification stage, comprising the following steps:
   i) feeding clarified white liquor into said ion-exchange unit in step a),
   ii) recovering an alkali metal hydroxide solution from the ion-exchange unit in step c),
   iii) removing an alkali metal sulphide solution from the said unit by water elution in step d),
   iv) feeding the alkali metal hydroxide in (ii) to a pulp oxygen delignification stage,
   v) feeding the effluent of the oxygen delignification stage in (iv) to a kraft recovery boiler for conversion of residual organics to alkali metal hydroxide and alkali metal carbonate.

7. A process according to claim 6, where the sulphide-solution of step iii) is recycled into a smelt tank as at least part of the water or weak wash addition.

8. A process according to claim 5 in which said solution from d) is fed to a wood chip pretreatment prior to pulping, an initial stage of pulping, or a stage for preparation of polysulphide-rich liquor.

9. A process according to claim 5, in which a portion of said solution from d) is recycled to a smelt tank as at least part of a water or weak wash addition to build up the sulphide concentration.

10. A process according to claim 2, wherein said liquor in a) is green liquor from a kraft pulp mill, said amphoteric ion-exchange resin is selective to alkali metal sulphide while rejecting alkali metal carbonate, and step c) comprises recovering an alkali metal carbonate solution from the ion exchange unit.

11. A process according to claim 10 in which said carbonate solution is causticized, to produce a caustic-rich liquor adapted to be fed to a final stage of pulping or in place of caustic or oxidized white liquor in oxygen delignification, extraction stage, alkaline leaching, pH adjustment or scrubbing applications.

12. A process according to claim 10 wherein said solution from d) is evaporated to a higher concentration of said sulphide.

13. A process according to claim 2, wherein prior to step a) the pulping liquor is filtered to remove suspended particles and provide said clarified liquor so as to reduce the level of non-process elements in the recovery cycle and to remove fibre.

14. A process for removing at least one of alkali metal sulphide and alkali metal thiosulphate from partially-oxidized white liquor comprising:
   i) feeding a first volume of said partially-oxidized white liquor into an ion-exchange unit housing an amphoteric resin which is selective to at least one of alkali metal sulphide and alkali metal thiosulphate while rejecting alkali metal sulphate, hydroxide and carbonate, said first volume being fed through said unit in a first flow direction,
   ii) sorbing at least one of alkali metal sulphide and alkali metal thiosulphate onto said resin in said unit from said first volume of liquor and recovering a liquor which is depleted in at least one of alkali metal sulphide and alkali metal thiosulphate flowing in said first flow direction from the ion-exchange unit, and subsequently iii) removing a solution containing at least one of an alkali metal sulphide and thiosulphate from the said unit by water elution by flowing a second volume of eluting water through said unit in a second flow direction which is a counterflow direction to said first flow direction, said second volume being not greater than said first volume.

15. A process according to claim 14 in which said liquor from ii) is fed to an oxygen delignification or scrubbing application, and whereas the solution from iii) is recycled back to a black liquor before the recovery boiler.

16. A process according to claim 14 for removing alkali metal thiosulphate from partially oxidized white liquor wherein said first volume contains alkali metal thiosulphate, said resin is selective for alkali metal thiosulphate while rejecting alkali metal sulphate, hydroxide and carbonate; step ii) comprises sorbing said alkali metal thiosulphate onto said resin and recovering a liquor depleted in alkali metal thiosulphate; and step iii) comprises removing a solution containing alkali metal thiosulphate from said unit with said second volume.

17. A process for removing alkali metal sulphide from a spent alkaline solution comprising:
   i) feeding a first volume of the said sulphide-containing spent alkaline solution into an ion-exchange unit housing an amphoteric resin which is selective to alkali metal sulphide while rejecting alkali metal hydroxide, said first volume being fed through said unit in a first flow direction,
   ii) sorbing said alkali metal sulphide onto said resin in said unit from said first volume of liquor and recovering a solution flowing in said first flow direction which is depleted in alkali metal sulphide from the ion-exchange unit, and subsequently
   iii) removing an alkali metal sulphide solution from said unit by water elution by flowing a second volume of eluting water through said unit in a second flow direction which is a counterflow direction to said first flow direction, said second volume being not greater than said first volume.

18. A process according to claim 17 wherein said spent solution is a spent caustic scrubbing solution.

19. A process according to claim 17 in which said sulphide-depleted liquor in ii) is fed as make up or to a scrubbing application, whereas the sulphide solution from step iii) is fed as make up to a sulphide-rich stream in an extended delignification, or to a recovery cycle.

20. A process for separating a polysulphide from a kraft pulping liquor comprising:
   a) feeding a first volume of a polysulphide liquor containing alkali metal polysulfide from a kraft pulp mill, into an ion-exchange unit housing an amphoteric ion-exchange resin which is selective to alkali metal polysulphide and alkali metal sulphide while rejecting alkali metal hydroxide, said first volume being fed through said unit in a first flow direction,
   b) sorbing said alkali metal polysulphide onto said resin in said unit from said first volume of liquor,
   c) recovering an alkali metal polysulphide depleted pulping liquor which comprises alkali metal hydroxide, flowing in said first flow direction from the ion-exchange unit, and subsequently
   d) removing an alkali metal polysulphide solution from the said unit by water elution by flowing a second volume of eluting water through said unit in a second flow direction which is a counterflow direction to said first flow direction, said second volume being not greater than said first volume.

21. A process according to claim 20, in which said polysulphide solution is fed to a pulping stage to increase yield.

22. A process according to claim 20, in which said hydroxide solution is fed to a final stage of pulping, or to an oxygen delignification, extraction stage, alkaline leaching, pH adjustment or scrubbing application.

23. In a kraft pulping apparatus including, in combination, a digestor for digestion of wood with a pulping liquor, a recovery boiler for receiving spent liquor from said digestor, a smelt tank for receiving smelt from said recovery boiler and generating a pulp liquor, a causticizer for generating pulping liquor from the pulp liquor generated in said smelt tank, and means communicating said causticizer with said digestor for delivery of pulping liquor from said causticizer to said digestor, the improvement comprising,
   an ion-exchange unit housing an amphoteric resin selective for sodium sulphide, in communication with said combination, means for establishing a flow of a first volume of a liquor containing sodium sulphide from within said combination in a first flow direction through said unit,
   means for recovering liquor depleted in sodium sulphide from said ion-exchange unit, and
   means for eluting sodium sulphide from the ion-exchange unit with a second volume of an eluting water flowing in a second flow direction which is a counterflow direction to said first flow direction, through said unit, said second volume being not greater than said first volume.

24. An apparatus according to claim 23 wherein said ion-exchange unit is disposed in said means communicating said causticizer with said digester.

* * * * *